US009469060B2

(12) United States Patent
Hung

(10) Patent No.: US 9,469,060 B2
(45) Date of Patent: Oct. 18, 2016

(54) OPTICAL LENS AND INJECTION MOLD FOR PRODUCING SAME

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/300,176

(22) Filed: Jun. 9, 2014

(65) Prior Publication Data

US 2014/0362449 A1 Dec. 11, 2014

(30) Foreign Application Priority Data

Jun. 7, 2013 (TW) ............... 102120371 A

(51) Int. Cl.
| | |
|---|---|
| *G02B 7/02* | (2006.01) |
| *B29C 45/26* | (2006.01) |
| *B29D 11/00* | (2006.01) |
| *G02B 6/42* | (2006.01) |
| *B29L 11/00* | (2006.01) |

(52) U.S. Cl.
CPC ............ *B29C 45/26* (2013.01); *B29D 11/0048* (2013.01); *G02B 6/4204* (2013.01); *B29L 2011/0016* (2013.01); *G02B 7/02* (2013.01)

(58) Field of Classification Search
CPC .................................. G02B 7/02; G02B 7/021
USPC ....................... 359/741, 811, 819; 385/33, 88
See application file for complete search history.

(56) References Cited

U.S. PATENT DOCUMENTS

| | | | |
|---|---|---|---|
| 2009/0226133 A1* | 9/2009 | Jewell | G02B 6/327 385/33 |
| 2014/0248022 A1* | 9/2014 | Hung | G02B 6/4204 385/92 |

\* cited by examiner

*Primary Examiner* — William Choi
(74) *Attorney, Agent, or Firm* — Zhigang Ma

(57) ABSTRACT

An optical lens for an optical communication system is provided. The optical lens includes a front portion, a back portion opposite to the front portion, and a converging lens. The front portion includes a front end surface. The front portion defines a recess in the front end surface. The front portion includes a protrusion step protruding from a bottom surface of the recess. The converging lens is formed on the protrusion step.

12 Claims, 6 Drawing Sheets

OPTICAL LENS AND INJECTION MOLD FOR PRODUCING SAME

FIELD

The present disclosure relates to optical communication systems, and particularly to an optical lens used in an optical communication system, and an injection mold for producing the optical lens.

BACKGROUND

In an optical communication system, optical lenses are employed to couple optical signals between optical members. The optical lens is usually manufactured by an injection mold.

BRIEF DESCRIPTION OF THE DRAWING

The components of the drawing are not necessarily drawn to scale, the emphasis instead being placed upon clearly illustrating the principles of the embodiments of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
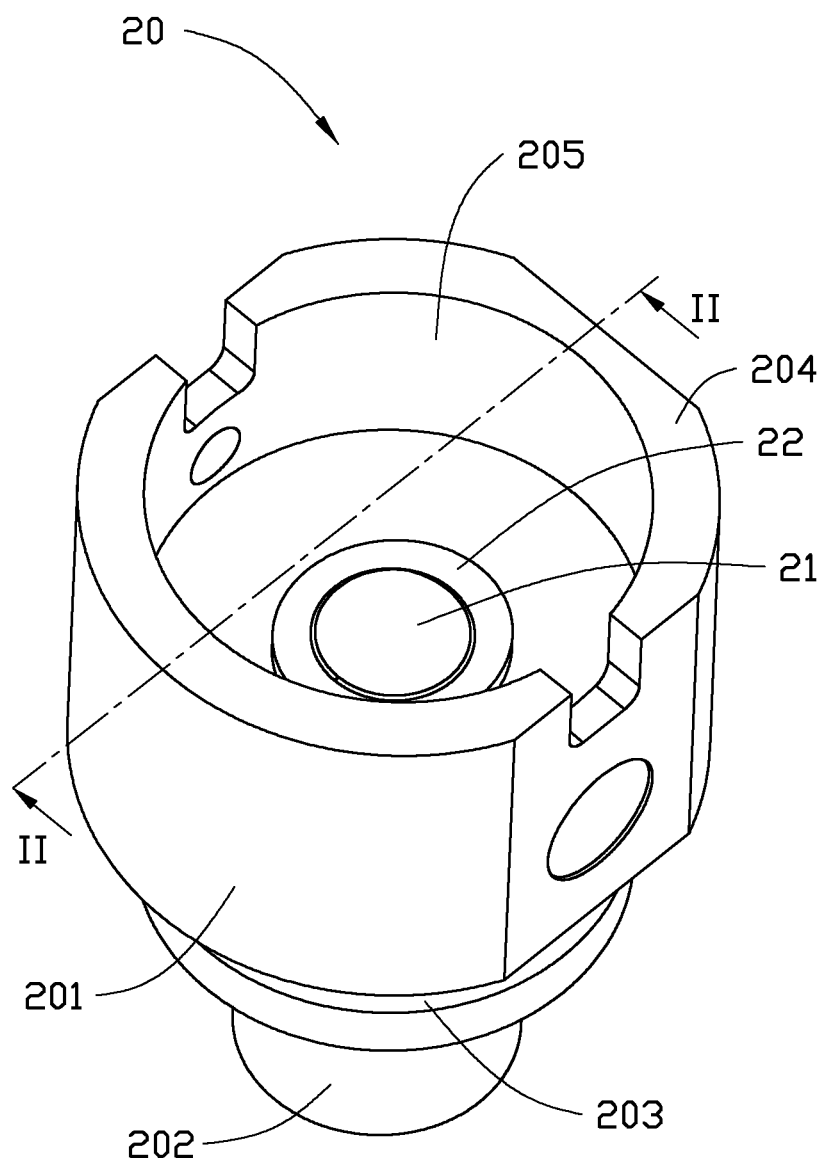
FIG. 1 is an isometric view of an embodiment of an optical lens of the present disclosure.

FIG. 1 illustrates an exemplary embodiment of an optical lens 20 of the present disclosure. The optical lens 20 is configured to couple optical signals between two optical elements in an optical communication system (not shown). The optical lens 20 includes a front portion 201, a back portion 202, and a middle portion 203. The middle portion 203 is connected between the front portion 201 and the back portion 202. In this embodiment, the front portion 201, the back portion 202, and the middle portion 203 are substantially cylindrical. A diameter of the front portion 201 is larger than that of the middle portion 203, and a diameter of the middle portion 203 is larger than that of the back portion 202.

The front portion 201 includes a front end surface 204 facing away from the back portion 202. The front portion 201 defines a recess 205 in the front end surface 204. The optical lens 20 further includes a protrusion step 22 protruding from a bottom surface of the recess 205, and a converging lens 21 located on the protrusion step 22. In this embodiment, the protrusion step 22 is substantially elliptical-shaped, and the converging lens is a convex lens.

Figure 2:
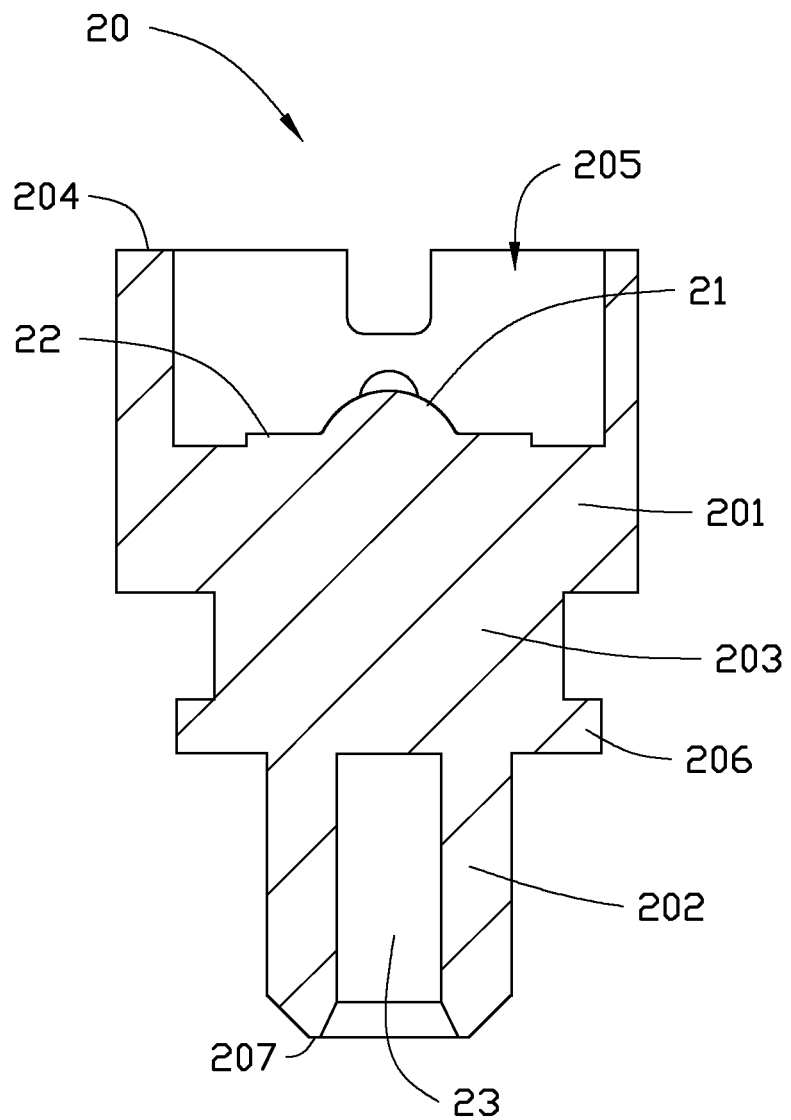
FIG. 2 is a cross-sectional view of the optical lens of FIG. 1, taken along line II-II.
Figure 3:
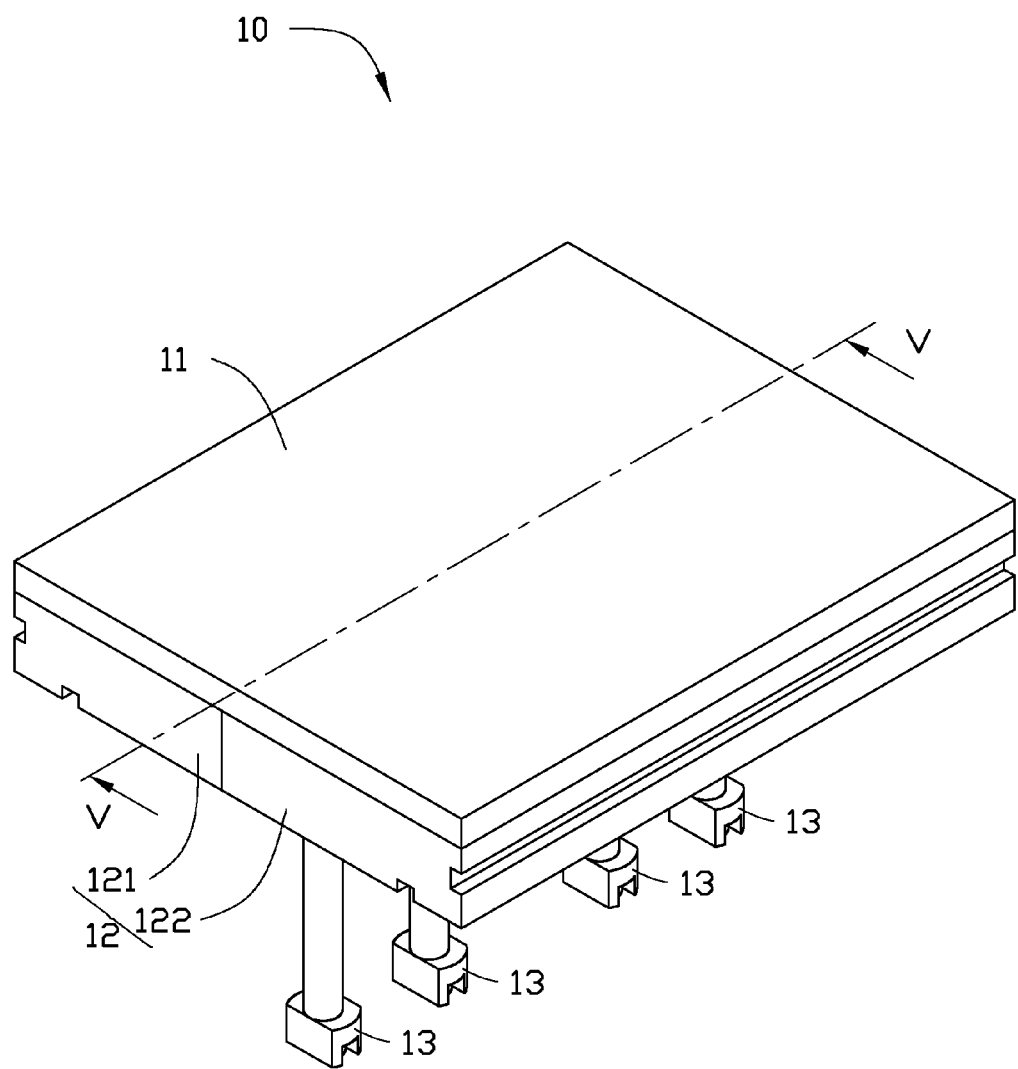
FIG. 3 is an isometric view of an embodiment of an injection mold of the present disclosure.
Figure 4:
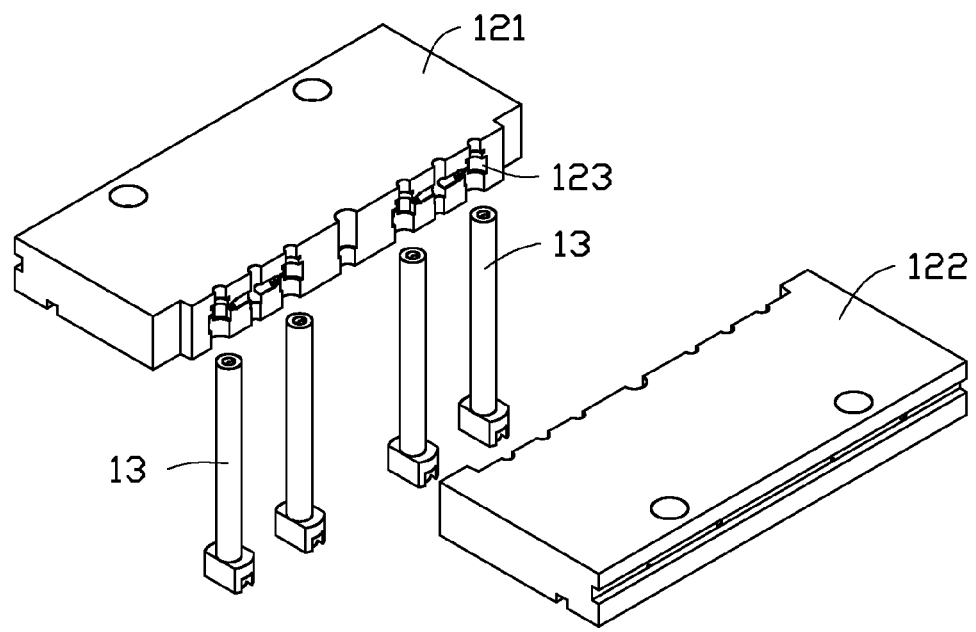
FIG. 4 is an exploded view of the injection mold of FIG. 3.
Figure 5:
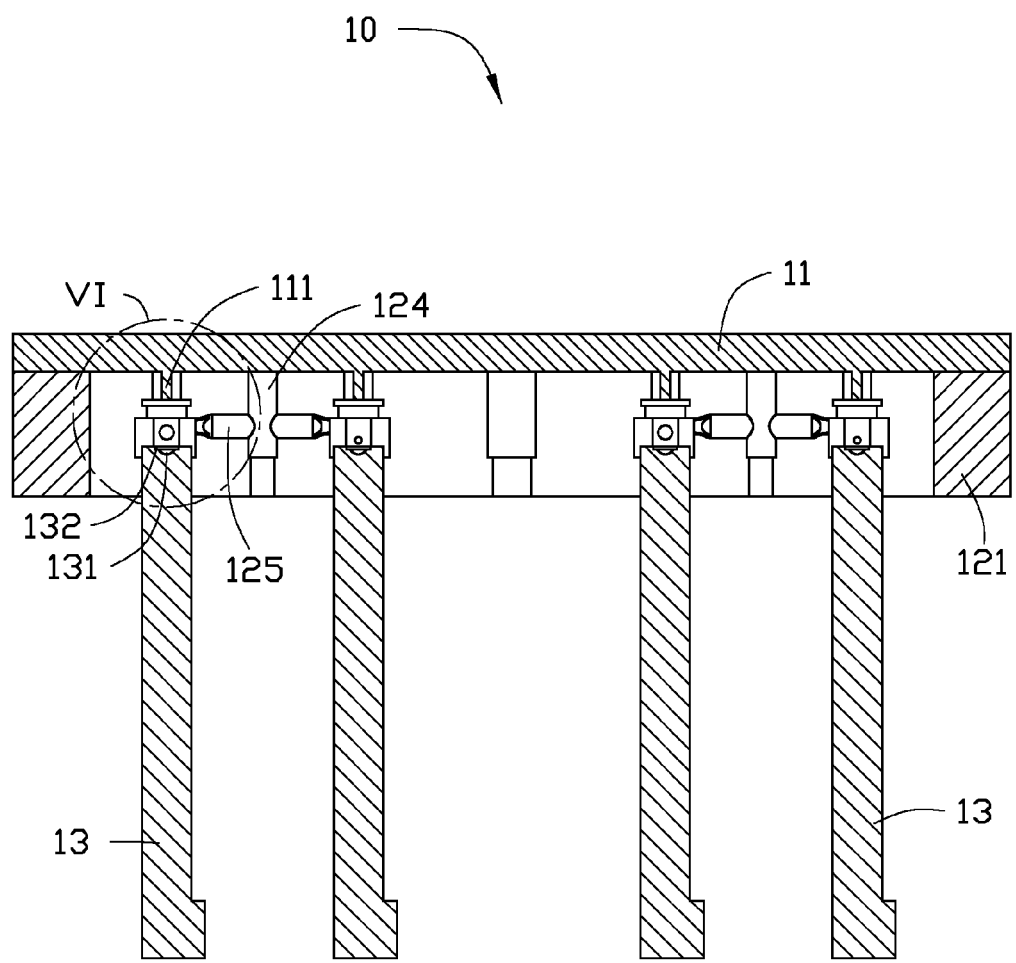
FIG. 5 is a cross-sectional view of the injection mold of FIG. 3, taken along line V-V.
Figure 6:
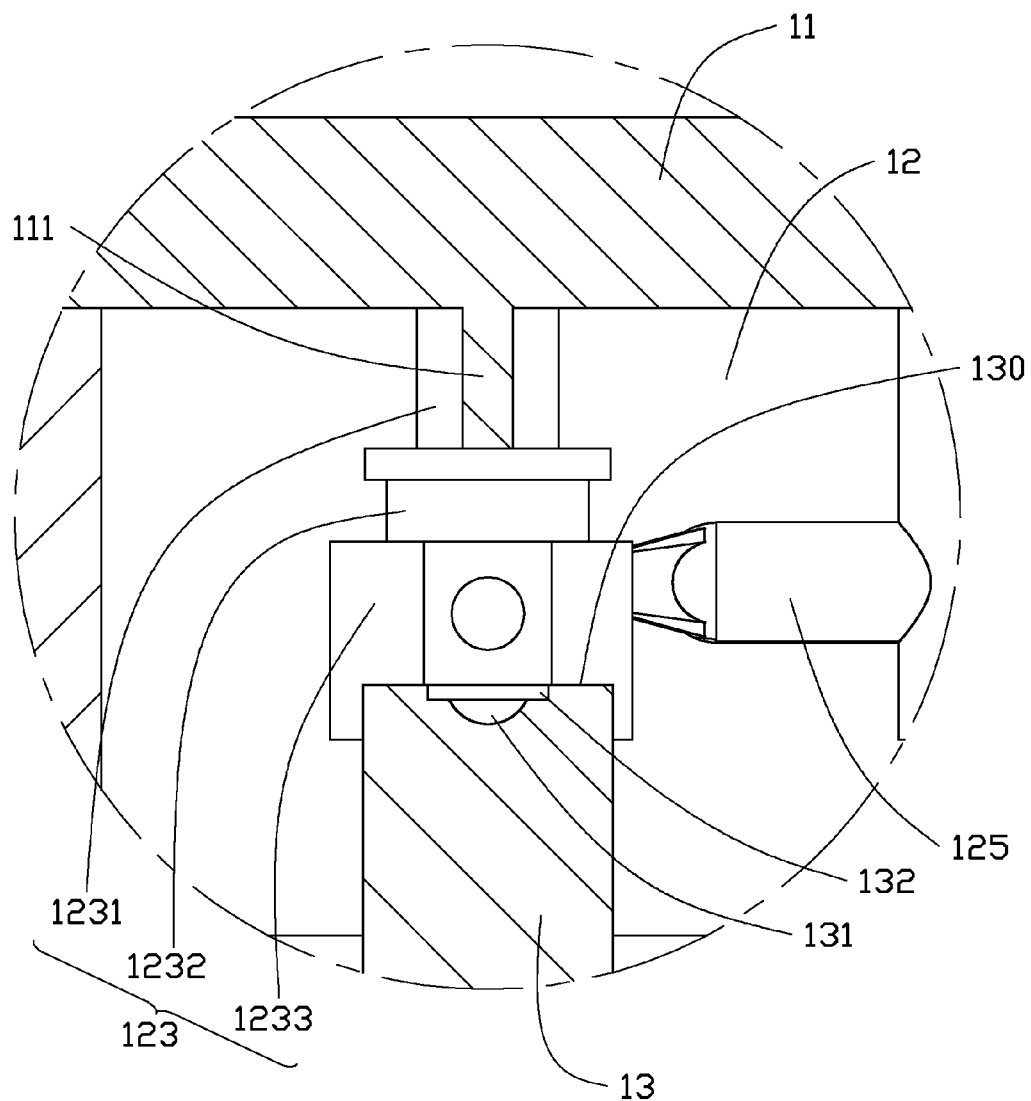
FIG. 6 is an enlarged view of a circled portion VI of FIG. 5.

FIG. 2 illustrates a cross-sectional view of the optical lens 20 of FIG. 1. The back portion 202 includes a back end surface 207 facing away from the front portion 201. The back portion 202 defines a blind hole 23 in the back end surface 207. An end portion of an optical fiber (not shown) can be received and fixed in the blind hole 23.

The middle portion 203 includes a flange 206 protruding from a peripheral surface thereof. In this embodiment, the flange 206 is substantially ring-shaped. The flange 206 is configured to affix the optical lens 20 to another optical member (not shown).

FIGS. 3-6 illustrate an embodiment of an injection mold 10 for producing the optical lens 20. The injection mold 10 includes an upper plate 11, a lower plate 12, and a plurality of insert members 13. The lower plate 12 includes a first semi-plate 121 and a second semi-plate 122. The upper plate 11, the first semi-plate 121, the second semi-plate 122, and the insert members 13 cooperatively define a number of molding cavities 123. Each molding cavity 123 includes a first molding portion 1231 for molding the back portion 202 of the optical lens 20, a second molding portion 1232 for molding the middle portion 203 of the optical lens 20, and a third molding portion 1233 for molding the front portion 201 of the optical lens 20. The upper plate 11 includes a plurality of poles 111. Each pole 111 corresponds to one of the molding cavities 123. Each pole 111 inserts into the first molding portion 1231 of a corresponding molding cavity 123 for defining the blind hole 23 of the optical lens 20.

Each insert member 13 inserts into the third molding portion 1233 of a corresponding molding cavity 123 for defining the recess 205 of the optical lens 20. Each insert member 13 includes an end surface 130 on an inserting end thereof. Each insert member 13 defines a groove 132 in the end surface 130, and a lens molding portion 131 extending from a bottom surface of the groove 132. The groove 132 is configured to mold the protrusion step 22 of the optical lens 20, and the lens molding portion 131 is configured to mold the converging lens 21 of the optical lens 20. In this embodiment, the groove 132 is substantially elliptical-shaped.

The upper plate 11 and the lower plate 12 further cooperatively define a plurality of runners 124. Each runner 124 extends to two molding cavities 123. The runners 124 are configured for guiding liquid molding material (not shown) into the molding cavities 123.

In use, the liquid molding material is injected into the molding cavities 123 through the runners 124. The liquid molding material is guided into the lens molding portion 131 by the groove 132. Therefore, a precise shape of the converging lens 21 can be ensured.

It is believed that the present embodiments and their advantages will be understood from the foregoing description, and it will be apparent that various changes may be made thereto without departing from the scope of the disclosure or sacrificing all of its material advantages, the examples hereinbefore described merely being exemplary embodiments of the disclosure. The embodiments described herein are illustrative, and therefore should not be construed as limiting the scope of the following claims.

What is claimed is:

1. An optical lens for an optical communication system comprising:
   a front portion comprising a front end surface having a recess defined therein, and a protrusion step protruding from a bottom surface of the recess;
   a back portion opposite to the front portion; and
   a converging lens formed on the protrusion step.

2. The optical lens of claim 1, further comprising a middle portion connected between the front portion and the back portion.

3. The optical lens of claim 2, wherein front portion, the back portion, and the middle portion are substantially cylindrical-shaped.

4. The optical lens of claim 3, wherein a diameter of the front portion is larger than that of the back portion, a diameter of the middle portion is larger than that of the back portion and less than that of the front portion.

5. The optical lens of claim 2, wherein the middle portion comprises a flange formed on a peripheral surface thereof.

6. The optical lens of claim 5, wherein the flange is substantially ring-shaped.

7. The optical lens of claim 1, wherein the protrusion step is substantially elliptical-shaped.

8. The optical lens of claim 1, wherein the back portion comprising a back end surface facing away from the front portion, the back portion defines a blind hole in the back end surface.

9. The optical lens of claim 1, wherein the front portion comprises a sidewall surrounding the recess, the sidewall defines two locating notches opposite to each other and concaving from the front end surface toward the bottom surface.

10. The optical lens of claim 9, wherein each of the two locating notches communicates with the recess.

11. The optical lens of claim 9, wherein the sidewall further defines two through holes opposite to each other and respectively located between the bottom surface and the two locating notches.

12. The optical lens of claim 11, wherein each of the two through holes communicates with the recess.

* * * * *